(12) United States Patent
Takeyama et al.

(10) Patent No.: US 9,991,525 B2
(45) Date of Patent: Jun. 5, 2018

(54) END PLATE FOR FUEL CELL, FUEL CELL, AND FUEL CELL SYSTEM

(71) Applicant: TOYOTA JIDOSHA KABUSHIKI KAISHA, Toyota-shi, Aichi-ken (JP)

(72) Inventors: Makoto Takeyama, Toyota (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 164 days.

(21) Appl. No.: 14/929,735

(22) Filed: Nov. 2, 2015

(65) Prior Publication Data

US 2016/0133953 A1  May 12, 2016

(30) Foreign Application Priority Data

Nov. 6, 2014  (JP) ................................. 2014-225927

(51) Int. Cl.
| | |
|---|---|
| *H01M 8/02* | (2016.01) |
| *H01M 8/04* | (2016.01) |
| *H01M 8/24* | (2016.01) |
| *H01M 8/0267* | (2016.01) |
| *H01M 8/04007* | (2016.01) |
| *H01M 8/04089* | (2016.01) |

(52) U.S. Cl.
CPC ..... *H01M 8/0267* (2013.01); *H01M 8/04067* (2013.01); *H01M 8/04104* (2013.01); *H01M 8/24* (2013.01)

(58) Field of Classification Search
None
See application file for complete search history.

(56) References Cited

U.S. PATENT DOCUMENTS

| | | |
|---|---|---|
| 2005/0221149 A1 | 10/2005 | Matsubayashi et al. |
| 2008/0057372 A1 | 3/2008 | Sommer et al. |
| 2013/0017470 A1 | 1/2013 | Hotta et al. |
| 2013/0295491 A1 | 11/2013 | Takeyama |
| 2014/0045088 A1 | 2/2014 | Drouhault et al. |

FOREIGN PATENT DOCUMENTS

| | | |
|---|---|---|
| CN | 103563151 A | 2/2014 |
| CN | 103563152 A | 2/2014 |
| JP | 2007-173166 | 7/2007 |
| JP | 2009-295511 | 12/2009 |
| JP | 2011-21568 | 2/2011 |
| JP | 2013-004352 A | 1/2013 |
| JP | 5354026 B2 | 9/2013 |
| KR | 10-2014-0002195 A | 1/2014 |
| WO | WO-2013/001603 A1 | 1/2013 |
| WO | WO2013/008315 A1 | 1/2013 |

*Primary Examiner* — Jonathan Crepeau
(74) *Attorney, Agent, or Firm* — Finnegan, Henderson, Farabow, Garrett & Dunner, LLP

(57) ABSTRACT

An end plate includes a first surface including a heat generator contact region set such that a heat generator contacts the heat generator contact region, the heat generator being included in a fuel cell system that includes the fuel cell; and a second surface opposite to the first surface, the second surface including a cooling medium flow path through which a cooling medium flows, and at least one flow path rib portion provided inside the cooling medium flow path.

5 Claims, 6 Drawing Sheets

END PLATE FOR FUEL CELL, FUEL CELL, AND FUEL CELL SYSTEM

INCORPORATION BY REFERENCE

The disclosure of Japanese Patent Application No. 2014-225927 filed on Nov. 6, 2014 including the specification, drawings and abstract is incorporated herein by reference in its entirety.

BACKGROUND OF THE INVENTION

1. Field of the Invention

The invention relates to an end plate for a fuel cell, a fuel cell, and a fuel cell system.

2. Description of Related Art

A fuel cell, which includes an end plate on a side of one end of a stack body in which a plurality of unit cells is stacked, is known. A pump, which supplies fluids such as reaction gases and a cooling medium, generates heat when the pump operates. The efficiency of the pump decreases at high temperatures. Therefore, for example, Japanese Patent Application Publication No. 2011-021568 (JP 2011-021568 A) has proposed a technology for bringing a compression pump, which compresses air and supplies the compressed air to a fuel cell, into contact with a metal end plate via a heat transfer member to transfer heat generated by the compression pump to the end plate for heat release.

For a fuel cell system having a fuel cell and a pump as described above, the reduction of the size of the pump has been taken into consideration in response to requests for reducing the size of the system. Since an amount of heat generated by the pump increases as the size of the pump is reduced, an amount of released heat may become insufficient and the temperature of the pump may not be sufficiently decreased, in the configuration described in JP 2011-021568 A.

SUMMARY OF THE INVENTION

An aspect of the invention provides an end plate for a fuel cell that includes a stack body in which a plurality of unit cells is stacked, the end plate being configured to be disposed on a side of at least one of ends of the stack body in a stack direction. The end plate includes a first surface including a heat generator contact region set such that a heat generator contacts the heat generator contact region, the heat generator being included in a fuel cell system that includes the fuel cell; and a second surface opposite to the first surface, the second surface including a cooling medium flow path through which a cooling medium flows, and at least one flow path rib portion provided inside the cooling medium flow path.

In the end plate according to the above-mentioned aspect, the cooling medium flows through the surface opposite to the surface including the heat generator contact region set such that the heat generator contacts the heat generator contact region. Therefore, heat transferred from the heat generator to the end plate can be released using the cooling medium. In addition, the at least one flow path rib portion is provided inside the cooling medium flow path through which the cooling medium flows. Thus, in the end plate, an area that contacts the cooling medium is increased, as compared to a case in which the flow path rib portion is not provided inside the flow path. Therefore, heat transferred from the heat generator to the end plate can be efficiently released to the cooling medium. As a result, the temperature of the heat generator can be efficiently decreased.

In the end plate according to the above-mentioned aspect, the first surface may include at least one plate rib portion provided around the heat generator contact region. With this configuration, in the end plate, an area that contacts surrounding air (atmosphere) is increased, as compared to a case in which the plate rib portion is not provided. Therefore, when the heat generator is disposed in contact with the end plate, heat transferred from the heat generator to the end plate can be efficiently released into surrounding air.

In the end plate according to the above-mentioned aspect, the cooling medium flow path may include at least a part of a region of the second surface, the region of the second surface corresponding to the heat generator contact region. With this configuration, when the heat generator is disposed in contact with the heat generator contact region, heat transferred from the heat generator to the end plate can be more efficiently released using the cooling medium.

In the end plate according to the above-mentioned aspect, the heat generator may be a fuel pump that supplies fuel to the fuel cell. An amount of heat generated by the fuel pump increases as the size of the fuel pump is reduced. With the above-mentioned configuration, heat generated by the fuel pump can be efficiently released. Therefore, the temperature of the fuel pump can be decreased, and accordingly, reduction in the efficiency of the fuel pump can be suppressed.

Another aspect of the invention provides a fuel cell. The fuel cell may include a stack body in which a plurality of unit cells is stacked, and the end plate according to the above-mentioned aspect. With this configuration, since the heat generator is disposed in contact with the end plate of the fuel cell, heat generated by the heat generator can be efficiently released.

Another aspect of the invention provides a fuel cell system. The fuel cell system includes the fuel cell according to the above-mentioned aspect and the heat generator. In the fuel cell system, the heat generator may contact the heat generator contact region of the end plate. With this configuration, heat generated by the heat generator can be efficiently released.

Note that the invention may be realized in various aspects. For example, the invention may be realized as a movable body in which a fuel cell system is installed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
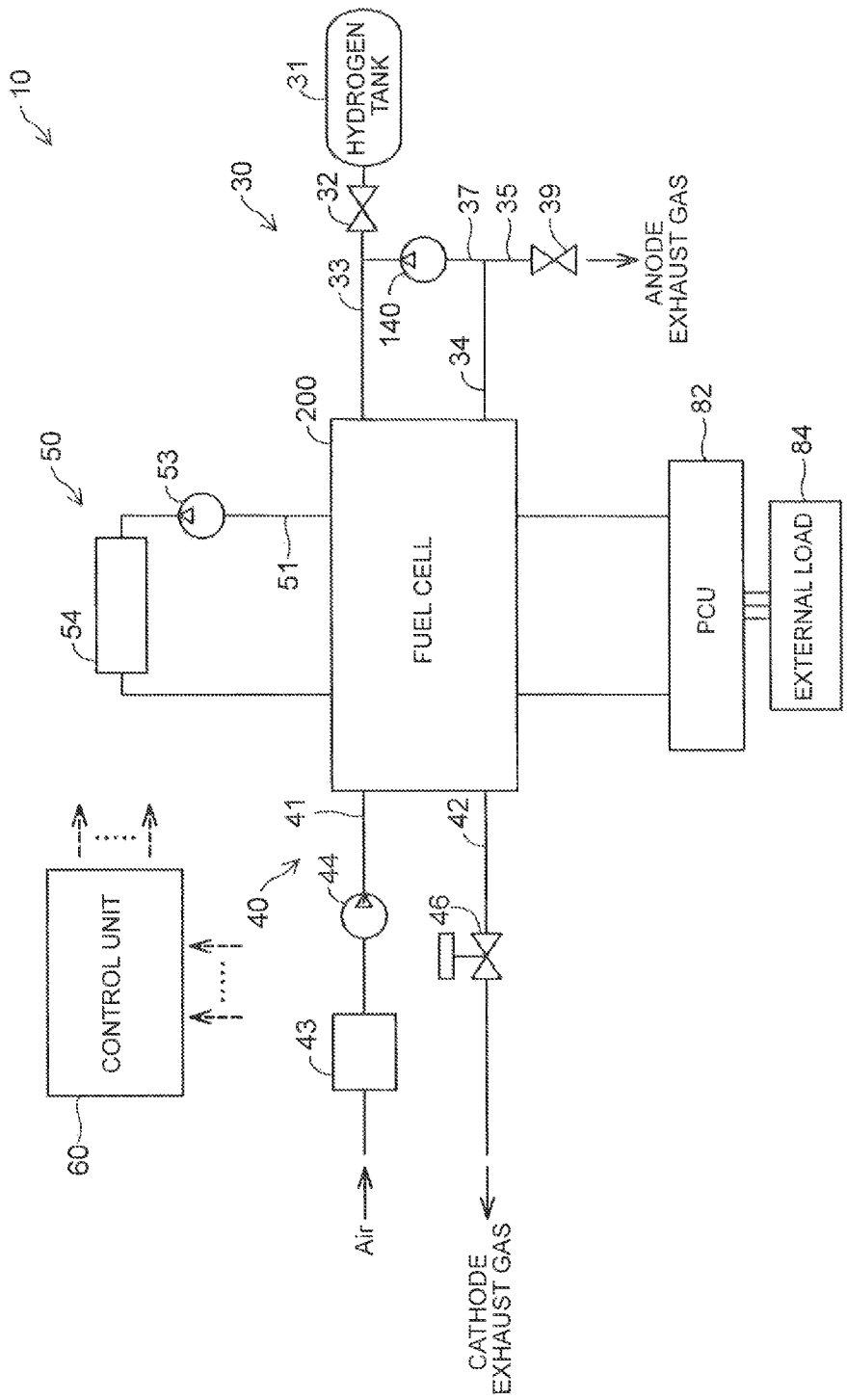
FIG. 1 is a diagram for illustrating the schematic configuration of a fuel cell system according to an embodiment of the invention.

FIG. 1 is a diagram for illustrating the schematic configuration of a fuel cell system according to an embodiment of the invention. A fuel cell system 10 of the embodiment mainly includes a fuel cell 200, a hydrogen supply and discharge system 30 that supplies and discharges hydrogen as a fuel gas, an air supply and discharge system 40 that supplies and discharges air as an oxidant gas, a cooling system 50 that cools the fuel cell 200, and a control unit 60 that controls the fuel cell system 10.

The fuel cell 200 is a polymer electrolyte fuel cell that is relatively small in size and is excellent in power generation efficiency and obtains an electromotive force when pure hydrogen as a fuel gas and oxygen in air as an oxidant gas undergo electrochemical reaction in electrodes. The fuel cell 200 has a stack structure in which a plurality of unit cells (not shown) is stacked, and the number of the stacked unit cells may be arbitrarily set according to an output required of the fuel cell 200.

In the hydrogen supply and discharge system 30, hydrogen is emitted from a hydrogen tank 31 that stores high-pressure hydrogen, and the hydrogen is supplied to the anode of the fuel cell 200 via a pipe 33 after its flow rate is controlled by an injector 32. An anode exhaust gas is introduced into a pipe 34 and is returned to the pipe 33 via a pipe 37 after its moisture is separated by a gas-liquid separator (not shown). The moisture of the anode exhaust gas separated by the gas-liquid separator is discharged into air via the pipe 35. A shut valve 39 is provided on the pipe 35, and the moisture of the anode exhaust gas is discharged when the shut valve 39 is opened. A hydrogen pump 140 is provided on the pipe 37 and regulates (adjusts) a circulation flow rate of the hydrogen of the anode exhaust gas.

In the air supply and discharge system 40, air compressed by an air compressor 44 is supplied to the cathode of the fuel cell 200 via a pipe 41. A cathode exhaust gas is emitted into air via a pipe 42. An air flow meter 43 is provided upstream of the air compressor 44 on the pipe 41 and measures an amount of air to be taken by the air compressor 44. An amount of air to be supplied by the air compressor 44 is controlled based on a value measured by the air flow meter 43. A manometer (not shown) and a pressure regulation valve 46 are provided on the pipe 42, and an opening of the pressure regulation valve 46 is regulated based on a pressure value of the cathode exhaust gas measured by the manometer.

The cooling system 50 mainly includes a pipe 51, a coolant pump 53, and a radiator 54. The coolant pump 53 causes coolant to flow through the pipe 51, and to circulate through the fuel cell 200 so as to cool the fuel cell 200. Then, after being cooled by the radiator 54, the coolant is supplied to the fuel cell 200 again.

The control unit 60 is constituted by a microcomputer including a central processing unit and a main storage unit. When receiving a power output request (i.e., a request for outputting electric power) from an external load 84, the control unit 60 controls the above-mentioned constituents of the fuel cell system 10 and a power control unit (PCU) 82 according to the request and causes the fuel cell 200 to generate the power. In addition to the above-mentioned constituents, a manometer, a thermometer, an amperemeter, a voltmeter, or the like may also be employed.

Figure 2:
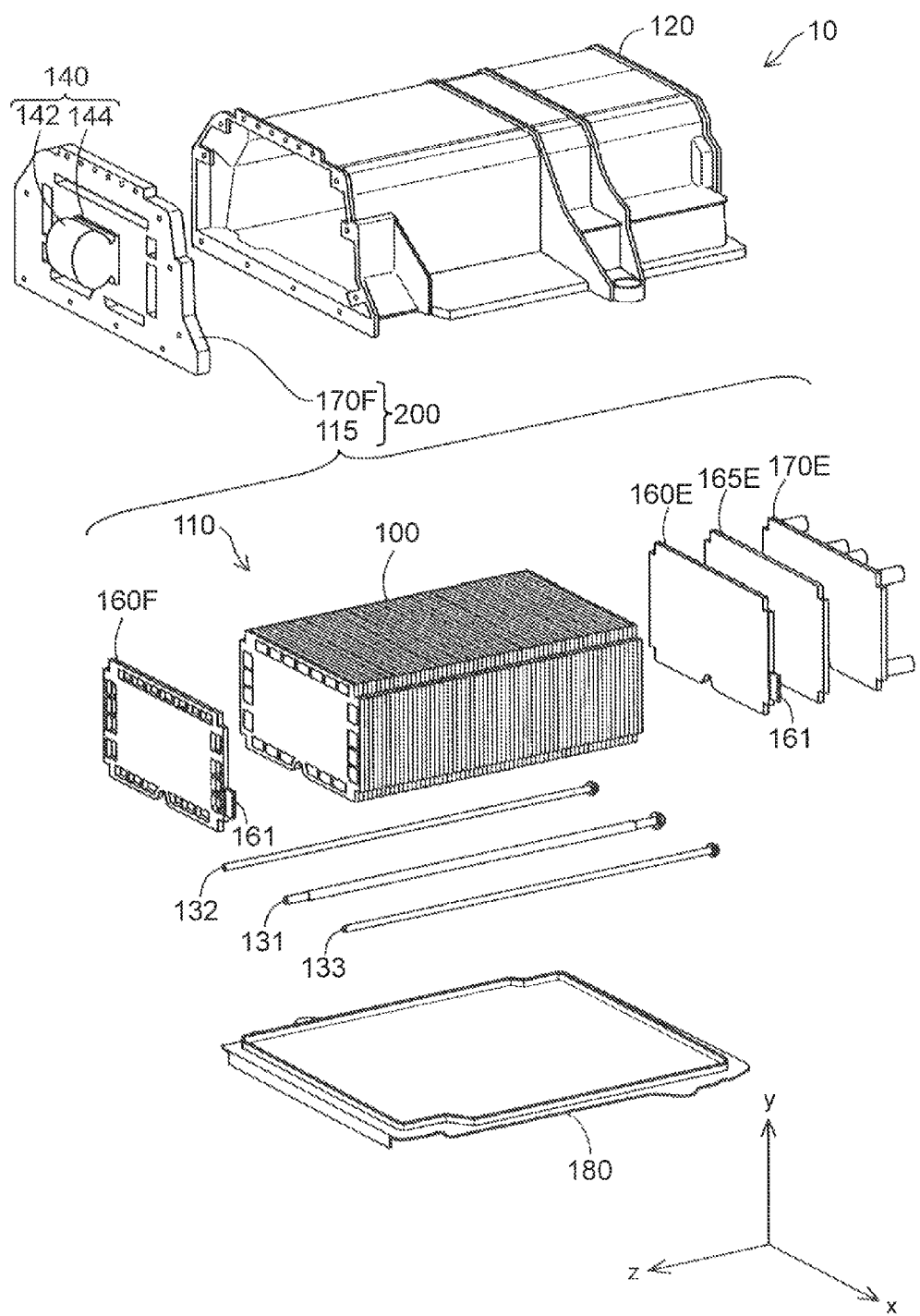
FIG. 2 is an exploded perspective view showing the schematic configuration of the fuel cell system.

FIG. 2 is an exploded perspective view showing the schematic configuration of a part of the fuel cell system. As shown in FIG. 2, the fuel cell system 10 of the embodiment includes the fuel cell 200, the hydrogen pump 140, three tension shafts 131, 132, and 133 (also collectively called tension shafts 130), a fuel cell case 120, and a case cover 180. In the following description, the positive direction of a z axis will be expressed as a front side, the negative direction of the z axis will be expressed as a rear side, the positive direction of a y axis will be expressed as an upper side, and the negative direction of the y axis will be expressed as a lower side. The hydrogen pump 140 in the embodiment may be regarded as a fuel pump and a heat generator according to the invention.

The fuel cell 200 has the stack structure in which a current collection plate 160F and an end plate 170F on a front end side (hereinafter called a "front-side end plate 170F") are stacked (disposed) in the stated order ahead of a stack body 110 including a plurality of unit cells 100 stacked in a z-axis direction (hereinafter also called a "stack direction"), and a current collection plate 160E, an insulation plate 165E, and an end plate 170E on a rear end side (hereinafter called a "rear-side end plate 170E") are stacked (disposed) in the stated order behind the stack body 110. In the following description, a portion in which the current collection plate 160F, the stack body 110, the current collection plate 160E, the insulation plate 165E, and the rear-side end plate 170E other than the front-side end plate 170F are stacked in the stated order will also be called a fuel cell main body 115. In addition, the current collection plates 160E and 160E will be called current collection plates 160 when they are not distinguished from each other. The front-side end plate 170F in the embodiment may be regarded as an end plate according to the invention.

Each of the unit cells 100 includes an anode-side separator (not shown), a cathode-side separator (not shown), and a seal member integrated membrane electrode assembly (MEA) (not shown). The unit cell 100 has, on its edge, a fuel gas supply hole, an anode exhaust gas discharge hole, six oxidant gas supply holes, seven cathode exhaust as discharge holes, three coolant supply holes, and three coolant discharge holes. Hereinafter, these supply holes and discharge holes will also be collectively called "supply and discharge holes". The supply and discharge holes are connected to the respective supply and discharge holes (that will be described later) of the current collection plate 160E and the front-side end plate 170F. When the plurality of unit cells 100 is stacked to constitute the fuel cell 200, manifolds that supply hydrogen as a fuel gas, air as an oxidant gas, and coolant to the respective unit cells 100 and manifolds that discharge an anode exhaust gas, a cathode exhaust gas, and coolant from the respective unit cells 100 are formed by these supply and discharge holes. Note that seal portions (not shown) are formed on the peripheries of the above-mentioned supply and discharge holes. By providing the seal portions, it is possible to secure the sealing performance of the manifolds at positions between the separators and positions between the separators and the current collection plates 160 when the unit cells 100 are stacked.

The current collection plate 160F on the front end side and the current collection plate 160E on the rear end side collect power generated by the unit cells 100 and output the electric power to an outside using current collection terminals 161. The current collection plate 160F on the front end side has, on its edge, supply and discharge holes similar to those of the unit cells 100. The current collection plate 160E on the rear end side does not have such supply and discharge holes.

The insulation plate 165E is an insulative resin plate, and the rear-side end plate 170E is a metal plate formed of aluminum. The insulation plate 165E and the rear-side end plate 170E do not have supply and discharge holes corresponding to the above-mentioned supply and discharge holes of the unit cells 100 like the current collection plate 160E. This is because the fuel cell has the configuration in which reaction gases (hydrogen and air) and coolant are supplied from the front-side end plate 170F to the respective unit cells 100 via the supply manifolds, while gases and coolant discharged from the respective unit cells 100 are discharged from the front-side end plate 170F to the outside via the exhaust manifolds. The fuel cell is not limited to this configuration, and may have various configurations. For example, the fuel cell may have a configuration in which reaction gases and coolant are supplied from the front-side end plate 170F and gases and coolant are discharged from the rear-side end plate 170E to the outside.

As shown in FIG. 2, the front side of the fuel cell case 120 is opened, and the rear side thereof is closed by the end surface (not shown) of the case. The fuel cell main body 115 is accommodated in the fuel cell case 120, and the front-side end plate 170F is fixed by bolts in a state in which the front-side end plate 170F closes an opening at the front side of the fuel cell case 120. In this state, the fuel cell 200 is configured such that the front-side end plate 170F, the current collection plate 160F, the stack body 110, the current collection plate 160E, the insulation plate 165E, and the rear-side end plate 170E are stacked in the stated order.

The tension shafts 130 are arranged below (in the negative direction of the y axis in FIG. 2) the fuel cell main body 115 to receive a load from the fuel cell main body 115. The front side of the tension shafts 130 is connected to the front-side end plate 170F, and the rear side thereof is connected to the end surface of the case. The lower side of the fuel cell case 120 is opened. In a state in which the fuel cell main body 115 is accommodated in the fuel cell case 120, the lower side of the fuel cell case 120 is closed by the case cover 180.

On the rear end surface of the fuel cell case 120, a through-hole for pressing (not shown) is formed. A pressing force in the stack direction of the fuel cell 200 is applied from the outside of the fuel cell case 120 to the rear-side end plate 170E by a press shaft (not shown) via the above-mentioned through-hole for pressing and then the rear-side end plate 170E is fixed by load adjustment screws (not shown) in a state where the rear-side end plate 170E is pressed. Thus, the pressing force in the stack direction is applied to the fuel cell 200. The front-side end plate 170F receives the pressing force in the stack direction, whereby the stacked states of the constituents of the fuel cell 200 are maintained and the contact states between the constituents are appropriately maintained.

As described above, the hydrogen pump 140 regulates (adjusts) a circulation flow rate of hydrogen in an anode exhaust gas discharged from the fuel cell 200 and supplies the hydrogen to the fuel cell 200. The hydrogen pump 140 includes a pump main body 142 having a substantially cylindrical (columnar) outer shape and a fixation plate 144 having a substantially flat plate shape. The fixation plate 144 is fixed to the front-side end plate 170F by bolts (not shown) such that the hydrogen pump 140 is fixed to the front-side end plate 170F. A heat transfer sheet (not shown) is interposed between the fixation plate 144 of the hydrogen pump 140 and the front-side end plate 170F, and heat generated by the hydrogen pump 140 is transferred to the front-side end plate 170F via the heat transfer sheet. Note that the heat transfer sheet may not be interposed.

Figure 3:
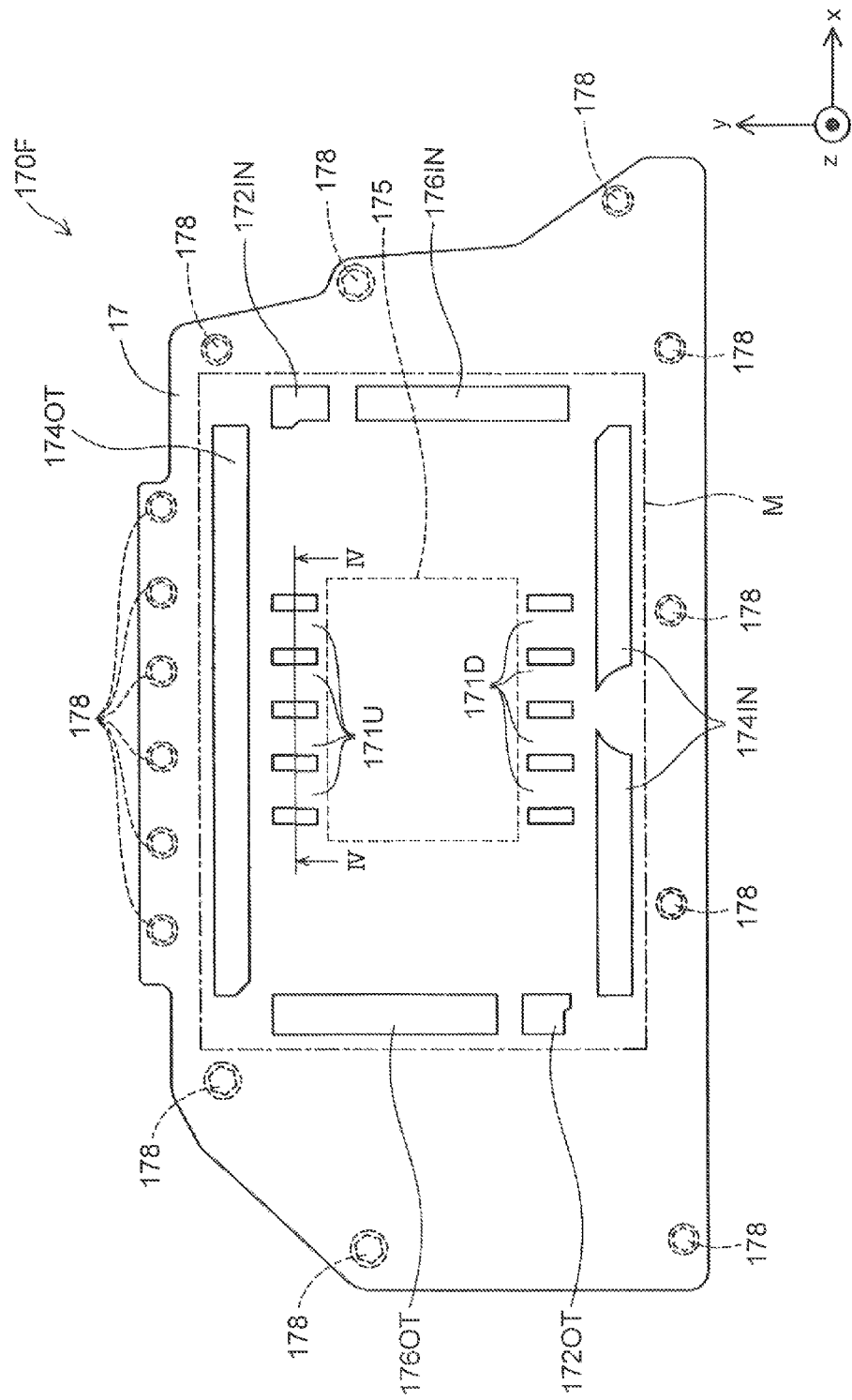
FIG. 3 is a plan view (of a pump surface) showing the schematic configuration of an end plate on a front end side in the embodiment of the invention.
Figure 4:
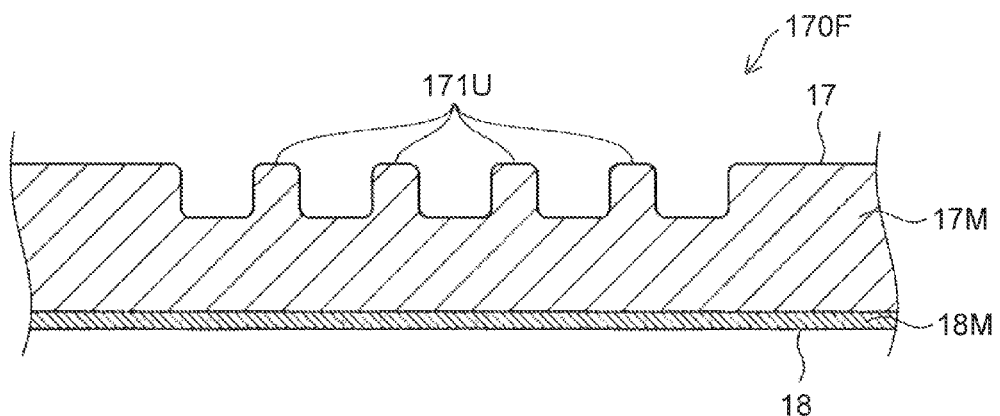
FIG. 4 is a partial sectional view showing a part of the end plate on the front end side.

The front-side end plate 170F includes a pump surface to which the hydrogen pump 140 is fixed, and a cooling surface opposite to the pump surface (in other words, a cooling surface that is a reverse surface of the front-side end plate 170F), the cooling surface including a coolant flow path that will be described later. First, the pump surface will be described based on FIGS. 3 and 4. FIG. 3 is a plan view (of the pump surface) showing the schematic configuration of the front-side end plate 170F in the embodiment of the invention. As described above, the front-side end plate 170F is disposed ahead of the stack body 110 such that the current collection plate 160F is disposed between the front-side end plate 170F and the stack body 110. In FIG. 3, a position at which the stack body 110 is arranged is shown by alternate long and short dash lines as an arrangement frame M in order to show the positional relationship between the front-side end plate 170F and the stack body 110. FIG. 4 is a partial sectional view showing a part of the front-side end plate 170F. In FIG. 4, a section taken along line IV-IV in FIG. 3 is schematically shown.

The front-side end plate 170F has an outer peripheral shape that is substantially the same as that of the front opening (FIG. 2) of the fuel cell case 120. As shown in FIG. 3, the front-side end plate 170F has, in the vicinity of its edge inside the arrangement frame M, a fuel gas supply hole 172IN, an anode exhaust gas discharge hole 172OT, oxidant gas supply holes 174IN, a cathode exhaust gas discharge hole 174OT, a coolant supply hole 176IN, and a coolant discharge hole 176OT. When the front-side end plate 170F is stacked (disposed) ahead of the stack body 110 such that the current collection plate 160F is disposed between the front-side end plate 170F and the stack body 110, the supply and discharge holes communicate with the respective manifolds formed in the stack body 110.

The front-side end plate 170F includes, at the pump surface 17, a pump contact region 175 with which the hydrogen pump 140 makes contact (in other words, the pump contact region 175 set such that the hydrogen pump 140 contacts the pump contact region 175). In the pump contact region 175, the fixation plate 144 (FIG. 2) of the hydrogen pump 140 is disposed. In addition, the front-side end plate 170F includes upper plate rib portions 171U arranged above the pump contact region 175 (in the positive direction of the y axis) and lower plate rib portions 171D arranged below the pump contact region 175 (in the negative direction of the y axis). The upper plate rib portions 171U are linear ribs extending in an up-down direction, that is, linear ribs extending in parallel with the y axis. As shown in FIG. 4, five recessed portions are formed on the plate surface of the front-side end plate 170F to form the four upper plate rib portions 171U. The lower plate rib portions 171D have the same shape as that of the upper plate rib portions 171U. Hereinafter, the upper plate rib portions 171U and the lower plate rib portions 171D will be collectively called plate rib portions 171 when they are not distinguished from each other. Note that the plate rib portions 171 are not shown in FIG. 2 (i.e., the illustration of the plate rib portions 171 is omitted in FIG. 2). The pump surface 17 in the embodiment may be regarded as a first surface according to the invention, the pump contact region 175 may be regarded as a heat generator contact region according to the invention, and the plate rib portion 171 may be regarded as a plate rib portion according to the invention.

The front-side end plate 170F has, in the vicinity of the edge, through-holes 190 (shown in FIG. 5) in which bolts 178 are inserted. As described above, the front-side end plate 170F is fixed to the fuel cell case 120 by the bolts 178 in a state in which the front-side end plate 170F closes the opening of the fuel cell case 120. In FIG. 3, the bolts 178 are shown by broken lines.

Figure 5:
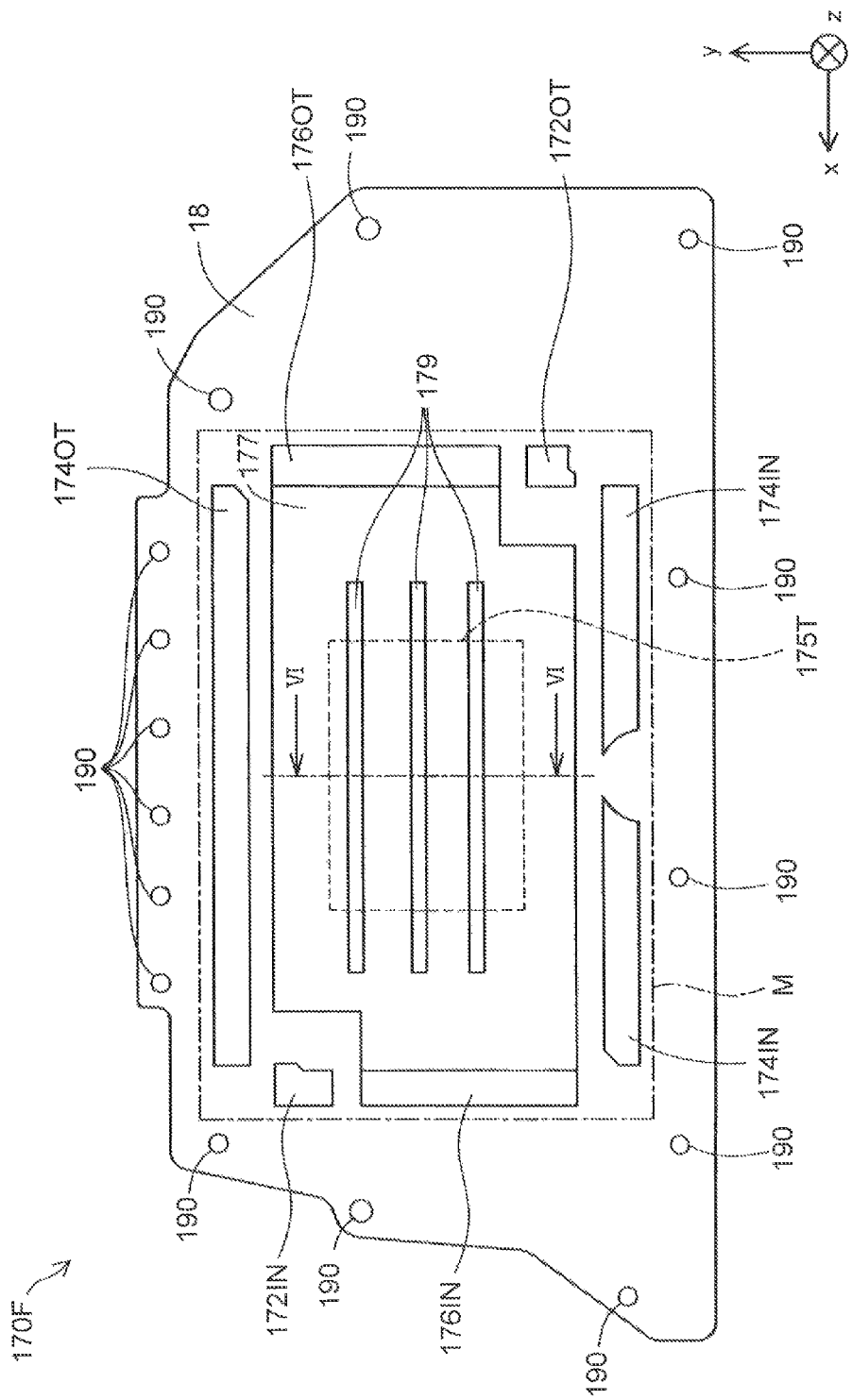
FIG. 5 is a plan view (of a cooling surface) showing the schematic configuration of the end plate on the front end side.
Figure 6:
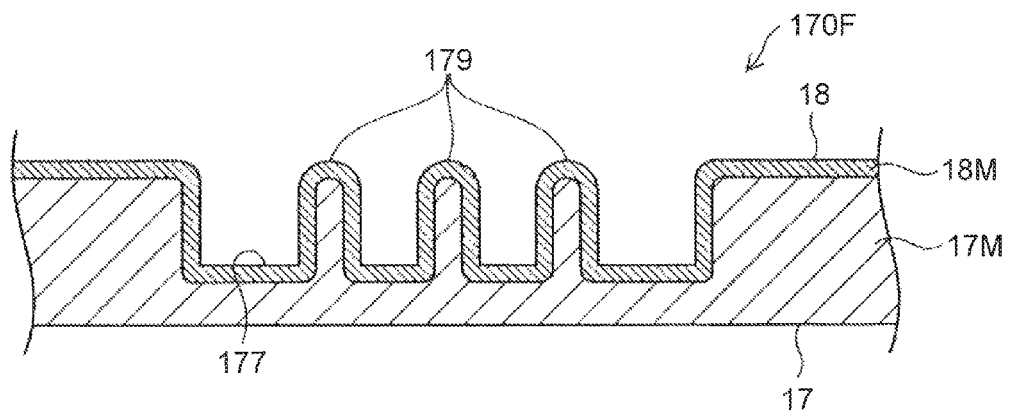
FIG. 6 is a partial sectional view showing a part of the end plate on the front end side.

Next, the cooling surface of the front-side end plate 170F will be described based on FIGS. 5 and 6. FIG. 5 is a plan view (of the cooling surface) showing the schematic configuration of the front-side end plate 170F. FIG. 6 is a partial sectional view showing a part of the front-side end plate 170F. In FIG. 6, a section taken along line VI-VI in FIG. 5 is schematically shown. When the front-side end plate 170F is stacked (disposed) ahead of the stack body 110 such that the current collection plate 160F is disposed between the front-side end plate 170F and the stack body 110, a cooling surface 18 of the front-side end plate 170F contacts the current collection plate 160F.

The cooling surface 18 of the front-side end plate 170F includes a coolant flow path 177 through which coolant flows and flow path rib portions 179 provided inside the coolant flow path 177. As shown in FIGS. 5 and 6, the coolant flow path 177 is formed into a recessed shape so as to connect the coolant supply hole 176IN and the coolant discharge hole 176OT to each other. In addition, the coolant flow path 177 includes an entire region (shown as a corresponding region 175T by broken lines in FIG. 5) that corresponds to the pump contact region 175 of the pump surface 17. The flow path rib portions 179 are linear ribs extending in parallel with each other in an x direction (FIG. 5) and contact the current collection plate 160F when the front-side end plate 170F is stacked on the current collection plate 160F. Coolant flows from the pipe 51 (FIG. 1) into the coolant flow path 177 via the coolant supply hole 176IN of the front-side end plate 170F and then returns to the pipe 51 via the coolant discharge hole 176OT.

The front-side end plate 170F includes an aluminum die cast portion 17M produced by high-pressure casting using aluminum and a resin portion 18M formed by coating the cooling surface 18-side of the aluminum die cast portion 17M with an insulative resin. As shown in FIGS. 4 and 5, the pump surface 17 of the front-side end plate 170F is the surface of the aluminum die cast portion 17M, and the cooling surface 18 is the surface of the resin portion 18M. In the embodiment, polypropylene (PP) is used as an insulative resin. When the cooling surface 18 of the front-side end plate 170F is disposed in contact with the current collection plate 160F, the front-side end plate 170F and the fuel cell main body 115 are electrically insulated from each other. Note that aluminum may be replaced by titanium, stainless steel, an alloy of titanium and stainless steel, an alloy of aluminum, titanium, and stainless steel, or the like. In addition, polypropylene (PP) may be replaced by polyethylene (PE), polystyrene (PS), or the like. The cooling surface 18 in the embodiment may be regarded as a second surface according to the invention, the coolant flow path 177 may be regarded as a cooling medium flow path according to the invention, and the flow path rib portion 179 may be regarded as a flow path rib portion according to the invention.

In the fuel cell system 10 of the embodiment, the hydrogen pump 140 is fixed to the front-side end plate 170F such that the heat transfer sheet is interposed between the hydrogen pump 140 and the front-side end plate 170F. Since the entire surface of the fixation plate 144 of the hydrogen pump 140 contacts the front-side end plate 170F via the heat transfer sheet, heat generated by the operation of the hydrogen pump 140 is efficiently transferred to the front-side end plate 170F. The cooling surface 18 of the front-side end plate 170F includes the coolant flow path 177, and the coolant flow path 177 includes the entire corresponding region 175T that corresponds to the pump contact region 175 of the pump surface 17, with which the hydrogen pump 140 makes contact. When coolant flows through the coolant flow path 177 after the coolant is supplied to the fuel cell 200 in the fuel cell system 10, the front-side end plate 170F is cooled by the coolant. Then, heat generated by the operation of the hydrogen pump 140 is transferred to the front-side end plate 170F (i.e., the heat generated by the hydrogen pump 140 is released) due to thermal equilibrium, and thus, the temperature of the hydrogen pump 140 is decreased.

In addition, the cooling surface 18 of the front-side end plate 170F includes the flow path rib portions 179 provided inside the coolant flow path 177. Thus, in the front-side end plate 170F, an area that contacts coolant is increased, as compared to a case in which the flow path rib portions 179 are not provided. Therefore, heat transferred from the hydrogen pump 140 to the front-side end plate 170F can be efficiently released to the coolant.

Moreover, the front-side end plate 170F includes the plate rib portions 171 provided around the pump contact region 175 of the pump surface 17. Thus, in the front-side end plate 170F, an area that contacts surrounding air (atmosphere) is increased, as compared to a case in which the plate rib portions 171 are not provided. Therefore, heat transferred from the hydrogen pump 140 to the front-side end plate 170F can be efficiently released into the surrounding air. With the above-mentioned configurations, the temperature of the hydrogen pump can be efficiently decreased and reduction in the efficiency of the hydrogen pump 140 can be suppressed.

As described above, the front-side end plate 170F is fixed to the fuel cell case 120 by the bolts 178. In addition, the ends at one side of the tension shafts 130 are fixed to the end surface (not shown) of the fuel cell case 120, and the ends at the other side thereof are fixed to the front-side end plate 170F. The upper surface of the fuel cell case 120 and the tension shafts 130 have rigidity. Therefore, when a pressing force is applied in the stack direction of the fuel cell 200, forces in the y axis direction are applied to the fuel cell 200 from the upper surface of the fuel cell case 120 and the tension shafts that contact the fuel cell 200. Since the front-side end plate 170F is connected to the upper surface of the fuel cell case 120 and the tension shafts 130, the forces in the y-axis direction are applied to the front-side end plate 170F toward the inner side of the front-side end plate 170F. Since the plate rib portions 171 in the front-side end plate 170F are formed into a linear shape parallel to the y axis, the plate rib portions 171 can increase the strength of the front-side end plate 170F against the forces applied from the upper surface of the fuel cell case 120 and the tension shafts 130 as compared to a case in which ribs parallel to the x axis are formed. That is, the plate rib portions 171 function not only as heat releasing members but also as reinforcing members.

Note that the invention is not limited to the above-mentioned embodiment, and may be carried out in various modes without departing from the scope of the invention. For example, the technical features of the embodiment corresponding to the technical features described in the respective modes in the summary of the invention may be appropriately replaced or combined with each other in order to solve some or all of the problems described above or achieve some or all of the effects described above. In addition, the technical features may be appropriately deleted so long as they are not essential in the specification. For example, the following modifications may be adopted.

(1) The front-side end plate 170F includes the plate rib portions 171 in the above-mentioned embodiment. However, the front-side end plate 170F may not include the plate rib portions 171. Even in a case in which the front-side end plate 170F does not include the plate rib portions 171, heat generated by the hydrogen pump 140 can be efficiently released by the coolant flow path 177 and the flow path rib portions 179.

(2) The shape of the front-side end plate 170F is not limited to the shape in the above-mentioned embodiment. That is, the outer peripheral shape of the front-side end plate 170F, the shapes and arrangements of the supply and discharge holes, the shapes and arrangements of the coolant flow path 177 and the flow path rib portions 179, and the shape and arrangement of the plate rib portions 171 are not limited to those in the above-mentioned embodiment. For example, although the coolant flow path 177 includes the entire corresponding region 175T that corresponds to the pump contact region 175 in the above-mentioned embodiment, the coolant flow path 177 may include at least a part of the corresponding region 175T or may not include the corresponding region 175T. Even in a case in which the coolant flow path 177 includes at least a part of the corresponding region 175T or does not include the corresponding region 175T, heat generated by the hydrogen pump 140 can be efficiently released as compared to a case in which coolant does not flow through the surface opposite to the pump surface 17 having the pump contact region 175. Although the three linear flow path rib portions 179 parallel to the x axis are formed in the above-mentioned embodiment, the shape, number, and arrangement of the flow path rib portions 179 may be appropriately changed. For example, the planar shape of the plate rib portions 171 may be a linear shape parallel to the x axis, an annular shape, a cross shape, a circular shape, a combination of these shapes, or the like, or the plate rib portions 171 may be formed on the right and left sides (in the x axis direction) of the pump contact region 175.

(3) Although the front-side end plate 170F is configured such that one surface of an aluminum die cast piece is coated with an insulative resin in the above-mentioned embodiment, the configuration of the front-side end plate 170F is not limited to the configuration in the above-mentioned embodiment. For example, the front-side end plate 170F may not be coated with an insulative resin (i.e., the front-side end plate 170F may not include the resin portion 18M). In a case in which the front-side end plate 170F does not include the resin portion 18M, an insulation plate may be provided between the front-side end plate 170F and the current collection plate 160F.

(4) Although the hydrogen pump 140 is fixed to the front-side end plate 170F in the above-mentioned embodiment, the device fixed to the front-side end plate 170F is not limited to the hydrogen pump 140 in the above-mentioned embodiment. Various heat generators (various devices that generate heat) may be fixed to the front-side end plate 170F. For example, a compression pump (air compressor) that compresses air and supplies the compressed air to the fuel cell 200, a coolant pump that circulates coolant, an injector that regulates pressure of high-pressure hydrogen emitted from a hydrogen tank, or the like may be fixed to the front-side end plate 170F.

(5) Although the hydrogen pump 140 is fixed to the front-side end plate 170F in the above-mentioned embodiment, the hydrogen pump 140 may be fixed to the rear-side end plate 170E. In a case in which the hydrogen pump 140 is fixed to the rear-side end plate 170E, the rear-side end plate 170E is required to include a coolant flow path and ribs inside the flow path, which are similar to those of the front-side end plate 170F. In addition, for example, it may also be possible to fix the hydrogen pump 140 and an air compressor to the front-side end plate 170F and the rear-side end plate 170E, respectively. In this case as well, heat generated by the air compressor can be efficiently released, by employing the configuration in which the rear-side end plate 170E includes a coolant flow path and ribs inside the flow path, which are similar to those of the front-side end plate 170F.

(6) Although the hydrogen pump 140 is fixed to the front-side end plate 170F in the above-mentioned embodiment, the hydrogen pump 140 may contact the front-side end plate 170F instead of being fixed to the front-side end plate 170F. For example, the fuel cell case may be formed so as to be capable of accommodating both the fuel cell 200 and the hydrogen pump 140, and the hydrogen pump 140 may be fixed to the fuel cell case such that the hydrogen pump 140 is in contact with the front-side end plate 170F. An auxiliary cover capable of accommodating the hydrogen pump 140 may be prepared in addition to the fuel cell case 120, the auxiliary cover may be fixed to the front-side end plate 170F in a state in which the hydrogen pump 140 is fixed inside the auxiliary cover and is in contact with the front-side end plate 170F. Even in this case, heat generated by the hydrogen pump 140 can be transferred to the front-side end plate 170F, by employing the configuration in which the hydrogen pump 140 contacts the front-side end plate 170F.

(7) Although the hydrogen pump 140 includes the fixation plate 144 and the entire surface of the fixation plate 144 contacts the front-side end plate 170F in the above-mentioned embodiment, the hydrogen pump 140 may not include the fixation plate 144. For example, the pump main body 142 may be fixed to the front-side end plate 170F while being supported by a belt-shaped support member. That is, the hydrogen pump 140 may contact the front-side end plate 170F at its surface or line (tangential line of the side surface of its cylindrical (columnar) shape). The pump contact region 175 of the front-side end plate 170F may be a linear region.

(8) Although coolant flows from the pipe 51 (FIG. 1) into the coolant flow path 177 via the coolant supply hole 176IN of the front-side end plate 170F and returns to the pipe 51 via the coolant discharge hole 176OT in the above-mentioned embodiment, the invention is not limited to this configuration. For example, coolant circulated inside the stack body 110 and discharged from the stack body 110 may flow through the cooling surface of the front-side end plate 170F. Even in this case, heat generated by the hydrogen pump 140 can be appropriately released.

What is claimed is:

1. An end plate for a fuel cell of a fuel cell system including a heat generator, the fuel cell including a stack body in which a plurality of unit cells is stacked, the end plate configured to be disposed on a side of at least one of ends of the stack body in a stack direction, the end plate comprising:
    a first surface including a heat generator contact surface configured to contact the heat generator;
    a second surface opposite to the first surface, the second surface including a cooling medium flow path through which a cooling medium flows, and at least one flow path rib portion provided inside the cooling medium flow path; and
    at least one plate rib portion provided on the first surface around the heat generator contact surface, the at least one plate rib portion protruding outward in the stack direction from a portion around the heat generator contact surface.

2. The end plate according to claim 1, wherein the cooling medium flow path includes at least a part of a region of the second surface, the region of the second surface corresponding to the heat generator contact surface.

3. The end plate according to claim 1, wherein the heat generator is a fuel pump that supplies fuel to the fuel cell.

4. A fuel cell comprising:
the end plate according to claim 1; and
the stack body.

5. A fuel cell system comprising:
the fuel cell according to claim 4; and
the heat generator, wherein the heat generator contacts the heat generator contact surface of the end plate.

* * * * *